(12) United States Patent
Lin

(10) Patent No.: US 8,944,589 B2
(45) Date of Patent: Feb. 3, 2015

(54) WATER SPORT GLASSES

(71) Applicant: Wei-Loon Lin, Kaohsiung (TW)

(72) Inventor: Wei-Loon Lin, Kaohsiung (TW)

( * ) Notice: Subject to any disclaimer, the term of this patent is extended or adjusted under 35 U.S.C. 154(b) by 99 days.

(21) Appl. No.: 13/788,491

(22) Filed: Mar. 7, 2013

(65) Prior Publication Data

US 2014/0253861 A1    Sep. 11, 2014

(51) Int. Cl.
*G02C 1/00* (2006.01)
*G02C 5/00* (2006.01)

(52) U.S. Cl.
CPC .............. *G02C 5/008* (2013.01); *G02C 2200/16* (2013.01)
USPC .......................................................... 351/43

(58) Field of Classification Search
CPC ........ G02C 5/001; G02C 5/008; G02C 7/022; G02C 11/00; G02C 2200/16
USPC ..................................................... 351/143, 43
See application file for complete search history.

(56) References Cited

U.S. PATENT DOCUMENTS 7,980,689 B2 *    7/2011   Hsu ................................. 351/43

\* cited by examiner

*Primary Examiner* — Huy K Mai
(74) *Attorney, Agent, or Firm* — Kolisch Hartwell, P.C.

(57) ABSTRACT

Water sport glasses have a frame, a pair of temples and a pair of optical lenses. The frame has a pair of rims and a bridge. The two rims are positioned in a straight line, and the bridge is between the rims and is connected to two rims. Each temple protrudes from one of the two rims toward a same direction. Each optical lens is disposed in the one of the rims. The frame and the temples are made of methylpentene copolymer and the density of the water sport glasses is less than 1 g/cm³.

20 Claims, 2 Drawing Sheets

WATER SPORT GLASSES

BACKGROUND OF THE INVENTION

1. Field of the Invention

The present invention relates to eyewear, and particularly to water sport glasses capable of floating on water.

2. Description of the Prior Arts

People now enjoy participating in water sport activities such as fishing, boating, scenic water tours, jet skiing, canoeing, etc. To protect eyes from any injury and sunshine while enjoying water sport activities, people often wear water sport glasses. However, when participating in an intense and vigorous water sport activity such as jet skiing, the water sport glasses easily fall from the wearer. Even though the wearer participates in a more static water sport activity such as fishing, the falling of the water sport glasses still happens due to carelessness. Most of the conventional water sport glasses are made of material with high density A fall of conventional water sport glasses often results in the glasses' loss in the water because the conventional water sport glasses sink in the water, which is the major drawback of the conventional water sport glasses.

To overcome the shortcomings, the present invention provides water sport glasses to mitigate or obviate the aforementioned problems.

SUMMARY OF THE INVENTION

Given that the aforesaid drawbacks of the prior art such as sinking in the water when falling, the main objective of the present invention is to provide water sport glasses comprising:

a frame having a pair of rims and a bridge, wherein the rims are positioned in a straight line, and the bridge is between the rims and is connected to the rims;

a pair of temples, each protruding from one of the rims on a position opposite to the bridge and toward a same direction;

a pair of optical lenses, each fitted in and encircled by one of the rims; and wherein the frame and the temples are made of methylpentene copolymer, and a density of the water sport glasses is less than 1 g/cm$^3$.

According to the present invention, the density of the water sport glasses is calculated by dividing the overall mass of the frame, two temples, two optical lenses and other components such as screws by the volume of the water sport glasses, wherein the mass of the frame is calculated by the volume of the frame multiplied by the density of the methylpentene copolymer, and the mass of the two temples is calculated by the volume of the two temples multiplied by the density of the methylpentene copolymer.

According to the present invention, the methylpentene copolymer is manufactured by dimerization of propylene to 4-methylpentene-1 and then subsequently copolymerization with alkenes.

According to the present invention, the number of carbon atoms in the alkenes ranges from 12 to 18.

Preferably, the density of the water sport glasses ranges from 0.85 to 0.9 g/cm$^3$.

Preferably, a density of the methylpentene copolymer ranges from 0.82 to 0.83 g/cm$^3$.

Preferably, the density of the methylpentene copolymer is 0.83 g/cm$^3$.

According to the present invention, the melting point of the methylpentene copolymer is about 240° C., the water absorption of the methylpentene copolymer is 0.01%, the vicat softening temperature of the methylpentene copolymer is between 160° C. and 170° C., and the contraction rate of the methylpentene copolymer is between 1.5% and 3.0%.

According to the present invention, the two temples are substantially perpendicular to the frame when unfolded.

Preferably, the material of the optical lenses is selected from the group consisting of: polycarbonate, cellulose triacetate, and polyamide 90. Preferably, the water sport glasses have a pair of binding components, each binding component is disposed between one of the temples and the frame for folding the two temples inwardly to make the temples in parallel with the frame.

According to the present invention, the binding components include, but not limited to, hinges, for the two temples to be hinged to the frame.

Preferably, the frame has a pair of nose pads, each nose pad protrudes from one of the rims on a position near the bridge and the two nose pads are between the two temples.

Preferably, the nose pads are made of methylpentene copolymer.

According to the aforementioned structure, because the frame and the two temples are made of methylpentene copolymer, the total mass of the water sport glasses is remarkably reduced and the density of the water sport glasses is reduced to less than 1 g/cm$^3$. Accordingly, when the water sport glasses fall while a wearer is participating in water sport activities, the water sport glasses will float on the water, which makes the water sport glasses easily to be found.

Other objectives, advantages and novel features of the invention will become more apparent from the following detailed description when taken in conjunction with the accompanying drawings.

DETAILED DESCRIPTION OF THE PREFERRED EMBODIMENTS

For a better understanding about the technical features of the present invention and its effect, and for implements in accordance with the disclosures of the specification, preferred embodiment, details and figures are further shown as follows.

Figure 1:
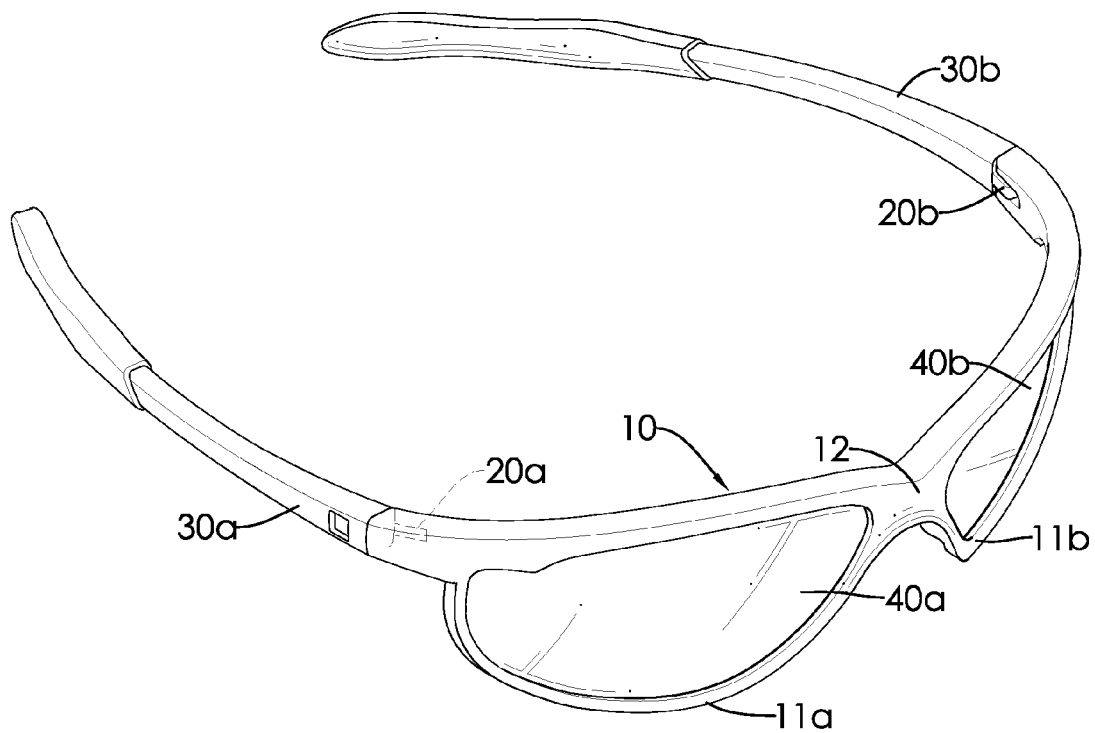
FIG. 1 is a perspective view of the water sport glasses in accordance with the present invention.
Figure 2:
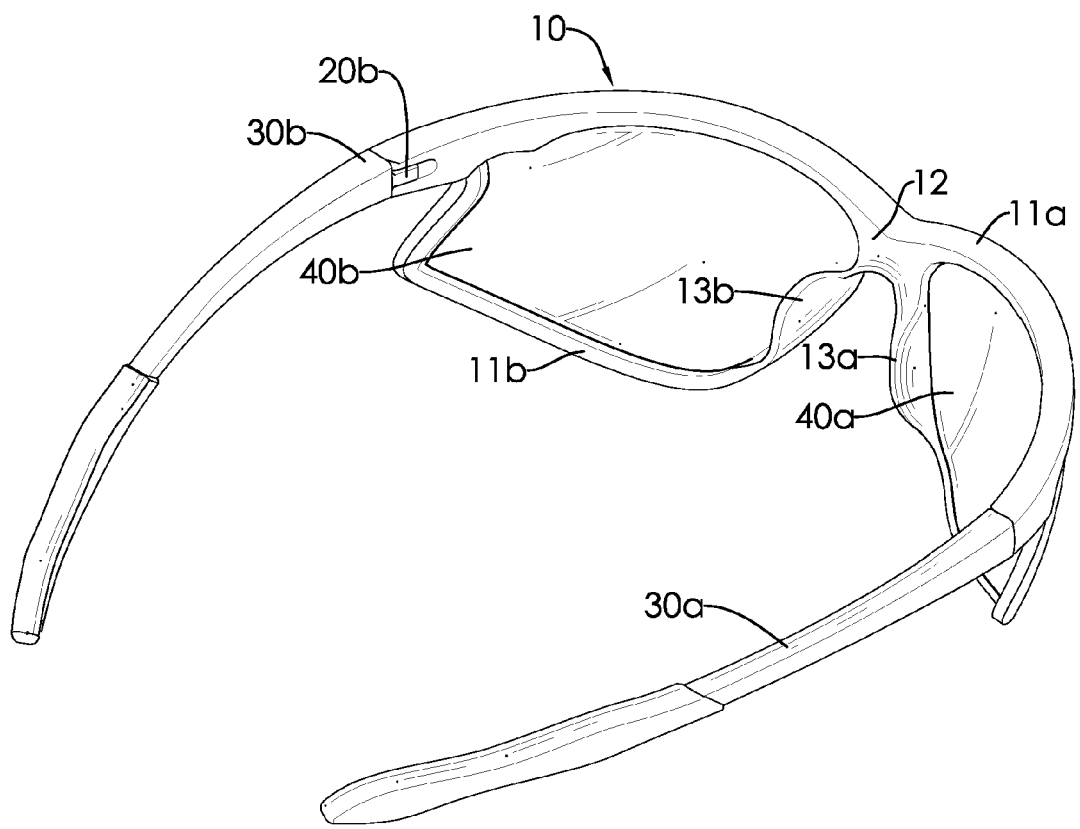
FIG. 2 is another perspective view of the water sport glasses in accordance with the present invention.

With reference to FIG. 1 to FIG. 2, the first embodiment of the water sport glasses in accordance with the present invention has a frame 10, a pair of binding components 20a, 20b, a pair of temples 30a, 30b, and a pair of optical lenses 40a, 40b.

The frame 10 has a pair of rims 11a,11b, a bridge 12, and a pair of nose pads 13a, 13b. The rims 11a,11b are positioned in a straight line, and the bridge 12 is between the rims 11a,11b and is connected to the rims 11a,11b. One of the nose pads 13a protrudes from a position near the bridge 12 of one of the rims 11a. The other nose pad 13b protrudes from a position near the bridge 12 of the other rim 11b. The frame 10 is made of methylpentene copolymer and the density of the methylpentene copolymer is 0.83 g/cm$^3$.

The binding components 20a, 20b are connected to the frame 10. One of the binding components 20a is connected on one of the rims 11a on a position opposite to the bridge 12. The other binding component 20b is connected on the other rim 11b on a position opposite to the bridge 12.

The temples 30a, 30b respectively are connected to the binding components 20a, 20b and respectively protrude from the rims 11a, 11b toward a same direction and the temples 30a, 30b are substantially perpendicular to the frame 10. The temples 30a, 30b are foldable inwardly for storage through the binding components 20a, 20b. When the temples 30a, 30b are folded, the temples 30a, 30b are in parallel with the frame 10. The aforementioned nose pads 13a, 13b are between the temples 30a, 30b. The temples 30a, 30b are made of methylpentene copolymer and the density of the methylpentene copolymer is 0.83 g/cm³.

The optical lenses 40a, 40b are respectively fitted in and encircled by the rims 11a, 11b. The optical lenses 40a, 40b are made of polycarbonate with a density of 1.2 g/cm³.

The density of the water sport glasses ranges from 0.85 to 0.9 g/cm³.

The process for making the water sport glasses comprises steps as follows.

The frame of the water sport glasses is produced by an injection molding process. The injection molding process is as follows. Raw material methylpentene copolymer is injected into an injection molding machine and then reaches a firing temperature ranging from 85 to 95° C. The drying time of the methylpentene copolymer is between 4 and 6 hours. The methylpentene copolymer is injected into a mold having a shape corresponding to the shape of the frame. The injection temperature ranges from 280 to 320° C. and the mold temperature ranges from 20 to 60° C. After the methylpentene copolymer is cooled through cold water and then is solidified in the mold, a frame will be obtained.

The frame then undergoes burr treatment instead of scroll treatment to smooth and remove rough edges of the frame and then the frame is polished.

A pair of temples made of methylpentene copolymer is prepared.

The temples are respectively attached to the frame through a pair of binding components. An optical blank is then obtained.

Polypropylene surface treating agent is sprayed on the surface of the optical blank to facilitate a coloring process to the surface of the optical blank afterwards.

A colorant is used to color the optical blank into an optical blank with a pre-determined color.

Finally, a pair of optical lenses is prepared and the optical lenses respectively inserted into the rims of the frame. The water sport glasses are accomplished.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. Water sport glasses comprising:
   a frame having a pair of rims and a bridge, wherein the rims are positioned in a straight line, and the bridge is between the rims and is connected to the rims;
   a pair of temples, each protruding from one of the rims on a position opposite to the bridge and toward a same direction;
   a pair of optical lenses, each fitted in and encircled by one of the rims; and
   wherein the frame and the temples are made of methylpentene copolymer, and a density of the water sport glasses is less than 1 g/cm³.

2. The water sport glasses according to claim 1, which has the density ranging from 0.85 to 0.9 g/cm³.

3. The water sport glasses according to claim 2, wherein a density of the methylpentene copolymer ranges from 0.82 to 0.83 g/cm³.

4. The water sport glasses according to claim 3, wherein the density of the methylpentene copolymer is 0.83 g/cm³.

5. The water sport glasses according to claim 4, wherein the material of the optical lenses is selected from the group consisting of: polycarbonate, cellulose triacetate, and polyamide.

6. The water sport glasses according to claim 5, wherein the water sport glasses have binding components, each disposed between one of the temples and the frame.

7. The water sport glasses according to claim 6, wherein the frame has a pair of nose pads, each protruding from one of the rims on a position near the bridge and the two nose pads are between the two temples.

8. The water sport glasses according to claim 7, wherein the nose pads are made of methylpentene copolymer.

9. The water sport glasses according to claim 3, wherein the material of the optical lenses is selected from the group consisting of: polycarbonate, cellulose triacetate, and polyamide.

10. The water sport glasses according to claim 9, wherein the water sport glasses have binding components, each disposed between one of the temples and the frame.

11. The water sport glasses according to claim 10, wherein the frame has a pair of nose pads, each protruding from one of the rims on a position near the bridge and the two nose pads are between the two temples.

12. The water sport glasses according to claim 11, wherein the nose pads are made of methylpentene copolymer.

13. The water sport glasses according to claim 2, wherein the material of the optical lenses is selected from the group consisting of: polycarbonate, cellulose triacetate, and polyamide.

14. The water sport glasses according to claim 13, wherein the water sport glasses have binding components, each disposed between one of the temples and the frame.

15. The water sport glasses according to claim 14, wherein the frame has a pair of nose pads, each protruding from one of the rims on a position near the bridge and the two nose pads are between the two temples.

16. The water sport glasses according to claim 15, wherein the nose pads are made of methylpentene copolymer.

17. The water sport glasses according to claim 1, wherein the material of the optical lenses is selected from the group consisting of: polycarbonate, cellulose triacetate, and polyamide.

18. The water sport glasses according to claim 17, wherein the water sport glasses have a pair of binding components, each disposed between one of the temples and the frame.

19. The water sport glasses according to claim 18, wherein the frame has a pair of nose pads, each protruding from one of the rims on a position near the bridge and the two nose pads are between the two temples.

20. The water sport glasses according to claim 19, wherein the nose pads are made of methylpentene copolymer.

* * * * *